July 17, 1951 J. H. LANDELLS 2,560,803

RADIO PROGRAM SELECTION SYSTEM

Filed Aug. 31, 1948 2 Sheets-Sheet 1

INVENTOR.
JOSEPH H. LANDELLS
BY Arlington C. White
ATTORNEY

RADIO PROGRAM SELECTION SYSTEM

Filed Aug. 31, 1948 2 Sheets-Sheet 2

INVENTOR.
JOSEPH H. LANDELLS
BY Arlington C. White
ATTORNEY

Patented July 17, 1951

2,560,803

UNITED STATES PATENT OFFICE 2,560,803

RADIO PROGRAM SELECTION SYSTEM

Joseph H. Landells, San Francisco, Calif., assignor of one-half to Eugene M. Eichenbaum, San Francisco, Calif.

Application August 31, 1948, Serial No. 47,105

4 Claims. (Cl. 161—1)

The invention, in general, relates to radio receiving equipment, and more particularly relates to a system embodying a recorder device associated with a radio receiver with attendant tuning circuits for affording selective recording of radio programs at desirable times throughout any twenty-four hour period.

As is perhaps well known, there has been some attention given in recent years to the provision of recorder devices in combination or association with radio for effecting sound reproduction at times subsequent to the initial presentation. In general, these combinations have been worked out principally in the field of radio broadcasting with the recording device or transcriber associated with the radio broadcasting unit at the location of the broadcast. More recently, there has been some development of the same concept with respect to radio receiving sets in order that persons may be able to arrange for the recordation or transcription of one or more programs while away from home for subsequent play-back at a more convenient time. In general, most of these receiver-recorder combinations heretofore constructed and marketed are complex and cumbersome in structure as well as of costly manufacture and expensive to install and maintain. The present invention is directed to the provision of a relatively simply constructed and inexpensively produced receiver-recorder unit which can be marketed at such reasonable price as to be well within the financial resources of the average wage earner.

A primary object of my invention is to provide an improved radio program selection system embodying a recorder mechanism and electrical circuit in electrical connection with a radio receiver and responsive to pre-selected time intervals to afford the recordation of one or more radio programs for subsequent transmission or reproduction at any desired time.

Another important object of the invention is to provide an improved radio program selection system of the indicated nature which is additionally characterized by the incorporation of means affording selectivity of programs at any time during any 24 hour period or range of programs with automatic cut-out and automatic tuning in of programs as pre-selected.

A still further object of the present invention is to provide an improved system of the aforementioned character containing a minimum number of parts that can be produced inexpensively and which is highly dependable in operation with a relatively low maintenance expense.

Other objects of the invention, together with some of the advantageous features thereof, will appear from the following description of a preferred embodiment of the invention which is illustrated in the accompanying drawings. It is to be understood that I am not to be limited to the precise embodiment shown, nor to the precise arrangement of the various parts thereof, as my invention, as defined in the appended claims, can be embodied in a plurality and variety of forms.

Referring to the drawings:

Fig. 1 a diagrammatic plan view of clock mechanism and panel, forming parts of the preferred embodiment of the invention, parts being broken away to illustrate a segmental contact or brush carrying disc associated with the clock mechanism.

In its preferred form, the improved radio program selection system of my invention preferably comprises a clock mechanism, a plurality of timing discs driven in response to said clock mechanism; said discs having electrical contacts thereon arranged in pre-determined intervals, selector levers associated with said clock mechanism for establishing electrical circuits containing the contacts of said discs at predetermined time intervals, together with a radio receiver circuit including tuning circuit for the receiver, and a recorder circuit for effecting the recordation of pre-selected radio programs for subsequent transmission.

Figures 1, 2, 3, 4, 6, 7:
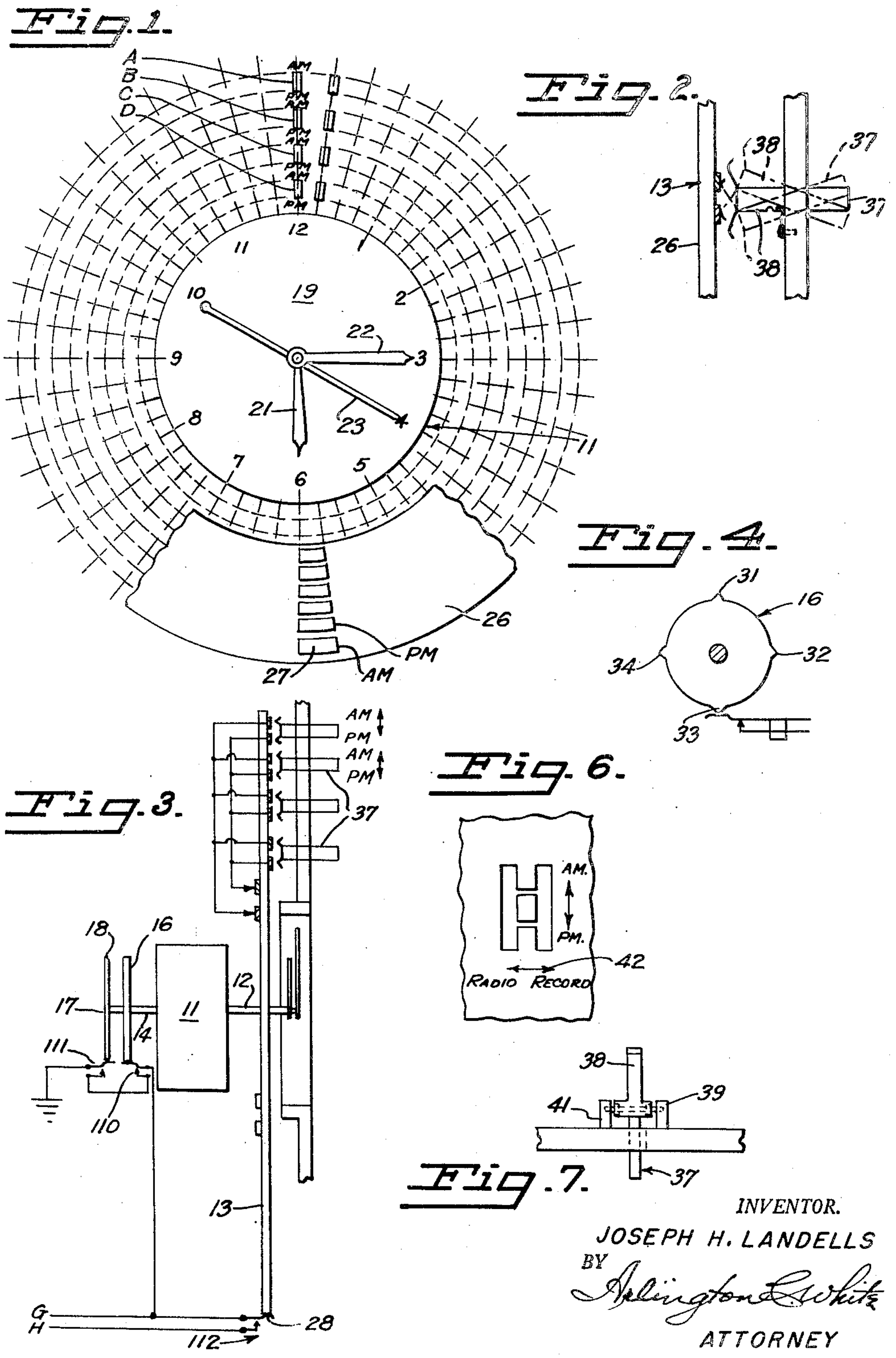
Fig. 2 is an enlarged, fragmentary detail illustrating the segmental brush carrying disc together with a selector lever holder employed in the preferred embodiment of the invention, this view showing various movable positions of the selector levers.
Fig. 3 is a diagrammatic view showing a portion of the electrical circuits and, in sectional elevational view, certain timing discs associated with the clock mechanism.
Fig. 4 is a detail of one of the timing discs carried on the minute shaft of the clock and illustrating raised buttons on the disc for making and breaking electrical circuits momentarily.
Fig. 6 is a detail illustrating one position of the selector levers forming a part of the preferred embodiment of the invention.
Fig. 7 is an enlarged, fragmentary detail illustrating the mounting of the selector levers in the preferred embodiment of the invention.

As particularly illustrated in Figs. 1 and 2 of the accompanying drawings, my improved radio program selection system includes a clock mechanism, illustrated in block diagram in Fig. 3 and designated generally by the reference numeral 11, which includes an hour-shaft 12 on which is fixedly mounted for rotation therewith a timing disc 13. The clock mechanism also includes a minute-shaft 14 on which is fixedly mounted for rotation therewith a timing disc 16, as well as a second-shaft 17 on which a rod or disc 18 is fixedly mounted for rotation therewith. A conventional face or dial 19 is provided for the clock 11, together with hour, minute and second hands 21, 22 and 23 secured on the hour, minute and second shafts 12, 14 and 17, respectively, with the usual hour delineations of 1 to 12 inclusive on the clock dial 19.

In accordance with my invention, timing disc 13 is formed with a plurality of segments 26 thereon, each carrying a plurality of split electrical contacts or brushes 27, covering arcs representing fifteen minutes of disc travel as it rotates with the hour shaft of the clock 11. Timing disc 13 also carries a raised button or nodule 28 on its periphery for effecting circuit closing and breaking once in each twelve hour period, as hereinafter explained, or as hour hand 21 passes through the 12 o'clock point in the travel of the timing disc 13. The timing disc 16 on the minute shaft 14 of the clock is provided on its periphery, see Fig. 4 of the annexed drawings, with four raised buttons or nodules 31, 32, 33 and 34 arranged 90 degrees apart for momentarily closing an electrical circuit, as hereinafter explained, each fifteen minutes of travel of timing disc 16. The rod or disc 18 on the second-shaft 17 effects momentary closing of an electrical circuit once each minute as hereinafter explained.

In addition to the foregoing elements, I provide a selector lever mounting block 36 in association with the clock mechanism 11 and with the timing discs above described; the block being supported in front of and in close proximity to the clock. Mounting block 36 conveniently is formed to a circular shape and movably supports a plurality of selector levers 37 which are arranged circumferentially at fifteen minute intervals around the clock face. Each selector lever includes a selector contact arm 38 for engaging separately either the upper or the lower half, designated in Fig. 3 of the annexed drawings as a. m. and p. m. halves, of the split contacts 27 on timing disc 13 mounted on the hour-shaft 12 of the clock. Each selector lever 37 is mounted to slide laterally in the mounting block 36, see Fig. 7, as well as for pivotal or rocking movement on pins 39 supported between ears 41 extending from the mounting block 36. Lateral movement of the selector levers 37 places the system in electrical connection with the radio receiver, not shown, through selector relays controlling the receiver, or with the recorder of the system, not shown, through selector relays controlling the recorder, as hereinafter explained and as indicated by the small arrows 42 of Fig. 6 of the accompanying drawings.

Figure 5:
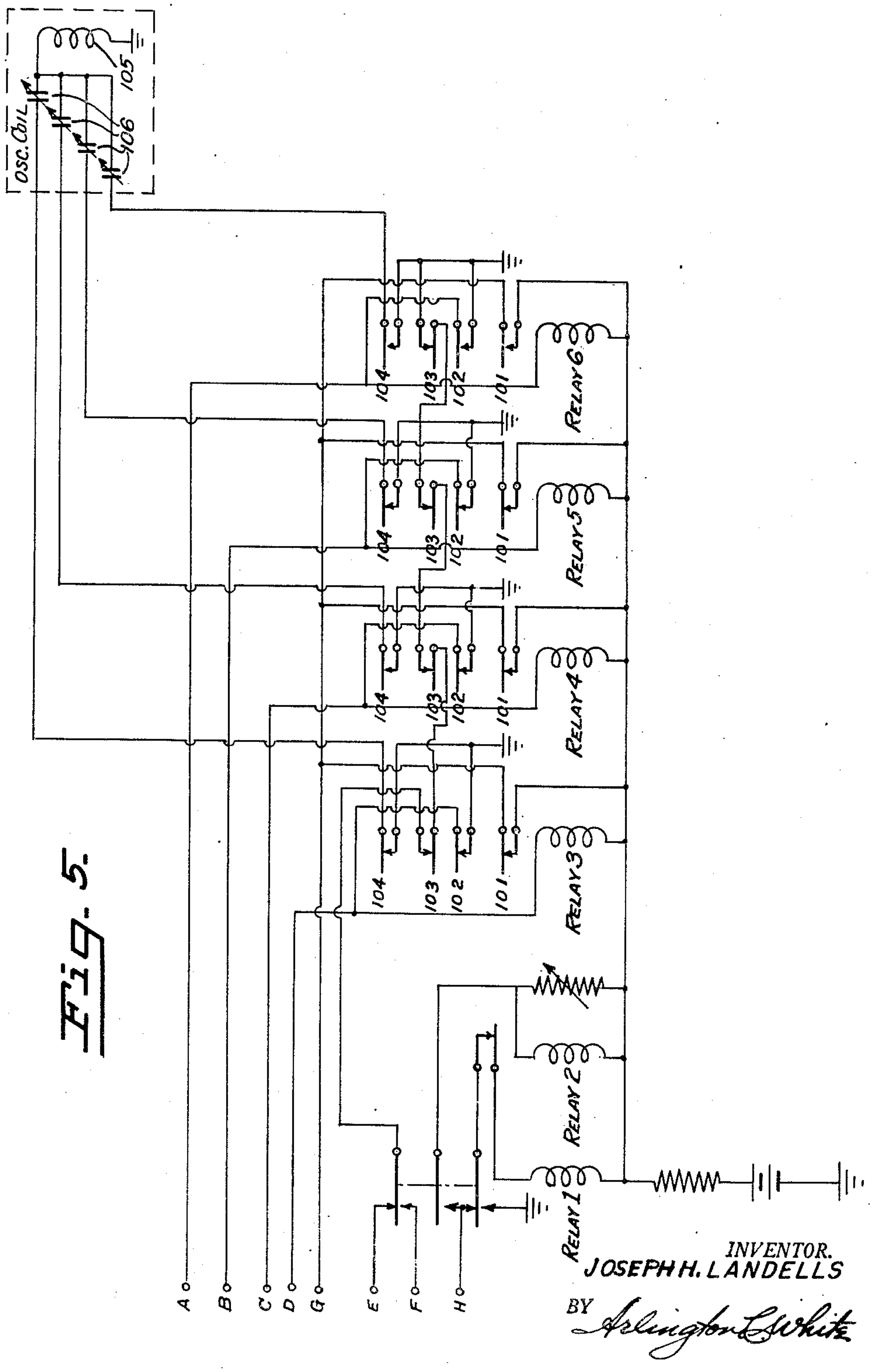
Fig. 5 is a schematic wiring diagram showing the main electrical circuits of the preferred embodiment of the invention.

A schematic wiring diagram for my improved system is set out in Fig. 5 of the drawings which shows that the electrical circuit of the system includes six relays designated by the reference characters and numerals as relay 1, relay 2, relay 3, relay 4, relay 5 and relay 6, together with suitable electrical conductors connecting the relays to the contacts of the timing discs above described and to the contact arms of the selector levers, all as indicated in Figs. 3 and 5 of the drawings. Each of the relays 3, 4, 5 and 6, hereinafter termed the selector relays, is provided with four sets of contacts 101, 102, 103 and 104 which electrically connect the relays to the tuning circuit of a radio receiver, or to a recorder unit as the case may be, represented by the coil 105 in Fig. 5 of the drawings, through reactances 106. It is to be understood that each row of selector levers 37 which, as stated above, may be any number desired and arranged circumferentially about the clock face at fifteen minute intervals, is so connected in the relay circuits as to effect the insertion of reactance elements 106 into one or more tuned circuits of a radio receiver, not shown, to tune the receiver to a desired station or frequency cycle. It is, of course, to be further understood that additional contacts, other than contacts 101, 102, 103 and 104 may be included in relays 3, 4, 5 and 6 to effect application of electrical power to a radio receiver, a recorder, or both. Moreover, that since each circumferential row of selector levers 37 is arranged in the selector relay circuits as to control the tuning to a particular station or broadcasting frequency of a radio receiver, the more rows of selector levers utilized or incorporated in the system, the more individual stations may be selected.

With particular reference to Fig. 3 of the annexed drawings, it will be observed that the portions of the split-contacts 27 of contact segments 26 which are designated by the reference characters a. m. are electrically connected as a group to contact brush, designated F, on timing disc 13 which, in turn, is electrically connected to and constitutes the F contact of relay 1, see Fig. 5 of the drawings. Moreover, that the portions of the split-contacts 27 of contact segments 26 which are designated by the reference characters p. m. are electrically connected as a group to contact brush, designated E, on timing disc 13 which, in turn, is electrically connected to and constitutes the E contact of relay 1; such E contacts of such relay being, in turn, electrically connected to the 103 contacts of relays 3 to 6 inclusive.

The operation of the improved system of the present invention may be explained as follows: Assume, initially, that relay 1 is energized. The bottom contact of relay 1 will hold the relay closed until contacts of relay 2 are opened; the operation of relay 2 being referred to hereinafter. Assume also that a selector lever 37 in row A, see Fig. 1, is raised, or placed in the a. m. position, in the radial row corresponding to 1:00 o'clock and also that a selector lever 37 in row B, see Fig. 1, is raised, or placed in the a. m. position, in the radial row corresponding to 1:15 o'clock. As the hour hand of the clock passes through 1:00 o'clock, the a. m. portion of the split-contact 27 for circumferential row A on contact segment 26 will engage the contact on selector lever arm 38 and thus will complete the electrical circuit to the coil of relay 6 through the F contacts of relays 1 and 2 and the 103 contacts of relays 3, 4, 5 and 6 to ground, causing relay 6 to be energized. Nearly simultaneously, contacts 104 of relay 6, with the relay closed, will effect the insertion of a reactance 106 into the tuning circuit of the radio receiver causing it to be tuned to the station or frequency previously selected to be controlled by row A of the selector lever mounting block or bank 36. After relay 6 has been energized, it is not necessary for the F contact brush on the timing disc 13 to be maintained as the 102 contact of relay 6 will maintain that coil circuit. As the timing dics 13, however, approaches 1:15 o'clock, the segment contact will effect closing of the selector circuit, as before, but relay 5 will not be energized as the 103 contact of relay 6 is now open and the contact actuating nodules, either 31, 32, 33 or 34, on timing disc 16 of the minute-shaft of the clock must first close or engage with contact 110, see Fig. 3, as well as contact brush on rod or disc 18 of the second-shaft of the clock with the contact 111, see Fig. 3 of the drawings. When the contacts 110 and 111 are closed, a circuit to ground through contact G to the bottom of the coil of relay 6 is established thus shorting that coil and de-energizing relay 6 and, as a result, all the 103 contacts of the relays close permitting relay 5 to operate and relay 5 re-tunes the radio receiver to the station previously set to be controlled by such relay 5, i. e., set by the predetermined circumferential row B and by the raising of the selector lever 37 of the B row at the radial row corresponding to 1:15 o'clock as above assumed. The operations of relays 3 and 4 are similar.

On the other hand, still assuming initial energization of relay 1, assuming that a selector lever 37 has been moved to a down position, or to a position effecting engagement of the contact on its lever arm 38 with that portion of a split-contact 27 designated by the reference characters p. m. In this situation, selector relays 3 to 6 would not operate as the contact of relay 1 connected to brush contact E of timing disc 13 is open. However, as timing disc 13 passes through the 12:00 o'clock position of the clock, the raised button or nodule 28 on its periphery effects a momentary engagement with a contact 112, see Fig. 3, and when the nodules, either of 31, 32, 33 or 34, on timing disc 16 of the minute-shaft 14 effects closing of contact 110 as well as rod or disc 18 on the second-shaft 17 effects closing of contact 111, grounded circuit is established through H contact of relay 1, see Figs. 3 and 5. This causes relay 2 to operate and open its contacts thus de-energizing relay 1 and transferring control of the program selectors to the now closed E contact of relay 1, which is electrically connected to the brush contact E on timing disc 13 to which the p. m. portions of the split-contacts 27 are electrically connected as a group, see Fig. 3. Obviously, any selector lever 37 in the down or p. m. position will now control the selector relays 3 to 6 inclusive. For effectiveness of operation, relay 2 must be adjusted to operate more slowly than relay 1 and this is accomplished by connecting a variable resistor 115 across the coil of relay 2, see Fig. 5, or by any other suitable means. As the timing disc 13 passes again through the 12:00 o'clock position of the clock, the coil circuit of relay 1 is energized through the H contact, as above explained, and through the contacts of relay 2. Since relay 2 is slow to operate, its contacts do not have time to open in the brief period during which the second-shaft contact 111 is closed and, accordingly, relay 1 remains energized.

By virtue of the arrangement of timing discs with their contact elements and the mounting of the selector levers 37 on mounting block or bank 36 for pivotal as well as lateral movement, all in association with the above described clock mechanism, it is possible to effect the establishment of predetermined tuning circuit of a radio receiver in order that a selected radio program may be heard at the particular time that it is being broadcast or, by proper lateral shifting of the selector levers 37 in mounting bank 36, such predetermined and pre-selected radio programs can be recorded so that they may be played back through the radio receiver at any convenient subsequent time.

It is to be understood that the appended claims are to be accorded a range of equivalents commensurate in scope with the advance made over the prior art.

I claim:

1. A radio program selection system comprising clock mechanism including hour, minute and second shafts, a first timing disc on said hour shaft divided into a plurality of contact segments each carrying split-contacts in circumferentially arranged rows affording a. m. and p. m. differentiations, a contact actuating nodule on the periphery of said first timing disc, a second timing disc on said minute shaft, contact actuating nodules on the periphery of said second timing disc at 90 degree intervals thereof, a third timing disc on said second shaft, a contact actuating nodule on the periphery of said third timing disc, a selector lever mounting block supported in proximity to said first timing disc, a plurality of selector levers each having a contact arm pivotally and slidably mounted on said mounting block in spaced intervals circumferentially about said block for selectively engaging any selected portion of any one of said split-contacts, and an electrical circuit containing a plurality of selector relays electrically connected to said contact arms of said levers and to said split-contacts for effecting the establishment of pre-selected tuning circuits of a radio receiver or for effecting establishment of a pre-selected recorder circuit.

2. A radio program selection system comprising a clock mechanism, an electrical circuit containing a plurality of relays; said relays being adapted to control the tuning circuit of a radio receiver, a plurality of timing discs connected to said clock mechanism and responsive to the movement of the hour, minute and second shafts thereof, contact actuating nodules on each of said timing discs a plurality of contacts in said electrical circuit, and means for causing the nodules of the timing disc on the hour shaft of said clock mechanism to engage said contacts and close said electrical circuit at any selected time for controlling one of said relays, and means for maintaining the selected relay in operation for a predetermined interval.

3. A radio program selection system as defined in claim 2, and including means for automatically de-energizing the controlled relay at the termination of a pre-determined time interval.

4. A radio program selection system as defined in claim 2, and including means for automatically de-energizing the controlled relay at the termination of a pre-determined time interval, and means for automatically establishing and maintaining a portion of said electrical circuit containing another of said relays.

JOSEPH H. LANDELLS.

REFERENCES CITED

The following references are of record in the file of this patent:

UNITED STATES PATENTS

| Number | Name | Date |
|---|---|---|
| 1,939,536 | Bond | Dec. 12, 1933 |
| 2,097,901 | Thomas | Nov. 2, 1937 |
| 2,145,973 | Clayson | Feb. 7, 1939 |